United States Patent
Dees et al.

(10) Patent No.: US 9,436,643 B2
(45) Date of Patent: Sep. 6, 2016

(54) HOST DEVICE, CLIENT DEVICE AND METHOD FOR WIRELESS DOCKING IN A DYNAMIC ENVIRONMENT FOR MUTLIPLE CLIENTS

(71) Applicant: KONINKLIJKE PHILIPS N.V., Eindhoven (NL)

(72) Inventors: Walter Dees, Eindhoven (NL); Johannes Arnoldus Cornelis Bernsen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/408,758

(22) PCT Filed: Oct. 11, 2013

(86) PCT No.: PCT/IB2013/059303
§ 371 (c)(1),
(2) Date: Dec. 17, 2014

(87) PCT Pub. No.: WO2014/057465
PCT Pub. Date: Apr. 17, 2014

(65) Prior Publication Data
US 2015/0205747 A1 Jul. 23, 2015

(30) Foreign Application Priority Data
Oct. 11, 2012 (EP) ..................................... 12188163

(51) Int. Cl.
*G06F 13/10* (2006.01)
*G06F 13/40* (2006.01)
(Continued)

(52) U.S. Cl.
CPC ......... *G06F 13/4068* (2013.01); *G06F 1/1632* (2013.01); *G06F 13/102* (2013.01); *H04M 1/7253* (2013.01); *H04W 84/12* (2013.01)

(58) Field of Classification Search
CPC ............................ G06F 1/1632; H04W 76/023
USPC ........................................................ 710/303
See application file for complete search history.

(56) References Cited

U.S. PATENT DOCUMENTS 6,782,241 B2   8/2004  Kobayashi
7,590,075 B2 * 9/2009  Pirzada et al. ................ 370/254
(Continued)

FOREIGN PATENT DOCUMENTS

JP    2004320542 A    11/2004
JP    2005217646 A    8/2005

OTHER PUBLICATIONS

"Wi-Fi Peer-to-Peer (P2P) Technical Specification, Version 1.1, 2010", Wi-Fi Alliance Technical Committee P2P Task Group.

*Primary Examiner* — Brian Misiura
(74) *Attorney, Agent, or Firm* — Larry Liberchuk (57) ABSTRACT

Method of communication between a host device, a first client device, a second client device and one or more peripheral devices and host device for use in such method, the host device comprising communication means for communicating with the client device and the one or more peripheral devices; a processor/controller connected to a memory suitable for storing configuration information and for controlling the communication means, the host device adapted to providing information in a wireless network with respect to availability of one or more sets of the peripheral devices to be connected with the client device; receiving via the wireless network a request from a first client device to connect to a first set of peripheral devices; determining that the first client device is docked to the first set; determining a second set of peripheral device that are free/available for connection to a second client device while the first client device is docked; providing information in the wireless network with respect to the second set. Advantageously, the host device is adapted to communicate with the first client and the second client with a Wi-Fi connection, the host device adapted to add the information with respect to the set of free/available peripherals in the beacon frames, probe request/response frames or through pre-association service discovery response frame.

14 Claims, 3 Drawing Sheets

(51) Int. Cl.
*G06F 1/16* (2006.01)
*H04M 1/725* (2006.01)
*H04W 84/12* (2009.01)

(56) References Cited

U.S. PATENT DOCUMENTS

| | | | |
|---|---|---|---|
| 7,656,849 B1 | 2/2010 | Evans | |
| 7,826,803 B2* | 11/2010 | Takasu | 455/69 |
| 8,254,992 B1 | 8/2012 | Ashenbrenner et al. | 455/557 |
| 8,374,157 B2* | 2/2013 | Tamir et al. | 370/338 |
| 8,472,436 B2* | 6/2013 | Meiri et al. | 370/386 |
| 8,493,992 B2* | 7/2013 | Sella et al. | 370/445 |
| 8,554,970 B2* | 10/2013 | Suumaki et al. | 710/303 |
| 8,774,048 B2 | 7/2014 | Raveendran | |
| 8,818,278 B2* | 8/2014 | Levy et al. | 455/41.2 |
| 9,008,723 B2* | 4/2015 | Toebes | 455/556.1 |
| 2006/0233191 A1 | 10/2006 | Pirzada | |
| 2009/0247082 A1* | 10/2009 | Sathath et al. | 455/41.2 |
| 2011/0188391 A1 | 8/2011 | Sella | |
| 2012/0099566 A1 | 4/2012 | Laine | |
| 2013/0145050 A1* | 6/2013 | Huang et al. | 710/3 |
| 2013/0311693 A1* | 11/2013 | HUANG et al. | 710/303 |
| 2014/0003409 A1* | 1/2014 | Van De Laar et al. | 370/338 |
| 2014/0010220 A1* | 1/2014 | Huang | 370/338 |
| 2014/0330998 A1* | 11/2014 | Dees et al. | 710/303 |
| 2015/0016417 A1* | 1/2015 | Dees et al. | 370/331 |
| 2015/0149679 A1* | 5/2015 | Mostafa et al. | 710/304 |

* cited by examiner

HOST DEVICE, CLIENT DEVICE AND METHOD FOR WIRELESS DOCKING IN A DYNAMIC ENVIRONMENT FOR MUTLIPLE CLIENTS

FIELD OF THE INVENTION

The present invention relates generally to the field of wireless communications and, more particularly, to a wireless docking host able to communicate with multiple client devices and to one or more peripheral devices.

The invention also relates to a method of communication between a host device, a first client device, a second client device and one or more peripheral device and it further relates to a wireless client device for wireless communication to a host device via a Wi-Fi connection.

The invention further relates to computer program product for use in a host device, which host device for use in the above mentioned method.

BACKGROUND OF THE INVENTION

In wired docking solutions, such as connecting to a docking station through a laptop docking connector, port replicator, USB connector or iPod/iPhone connector, there is a clear one-to-one relationship of the docked device and the docking station, since only a single device can use the docking station at anytime, and hence a clear one-to-many relationship of the docked device with the peripherals connected to the docking station.

In wireless docking, a wireless link is present between a client device, also known as a Wireless Dockee (WD), with a set of peripherals. The peripheral are usually connected to a host device, also known as a Wireless Docking Host (WDH) or a Wireless Docking Station. Such connection between the host device and the peripheral may be wired or wireless and it may use different connection protocols for each peripheral. In a docking action, the Wireless Docking Host (WDH) facilitates the establishment of connection between the Wireless Dockee (WD) with a set of peripherals.

Because at least some of the connections are wireless, in particular that between the docking host and the dockee, this allows for much more flexible usage scenarios, for example since there are no physical constraints it could be possible for multiple WDs to connect to the same wireless docking host, gaining access to the same set or a subset of the peripherals. For peripherals that are designed to be shared between multiple devices (e.g. an IP based printer that can manage its own print queue) multiple WDs could use such peripherals whilst being docked. However, most peripherals (e.g. many USB peripherals) are not designed to be shared between multiple devices.

Hence there is a need to allow for improved flexibility of realizing connection between the dockee devices and the peripherals.

SUMMARY OF THE INVENTION

It is an object of the invention to provide host device for allowing at least two client devices to dock with peripheral in a flexible way. For this purpose, it is provided a host device according to claim 1. The host device is adapted to providing information in a wireless network with respect to availability of one or more sets of the peripheral devices to be connected with the client device, receiving via the wireless network a request from a first client device to connect to a first set of peripheral devices, determining that the first client device is docked to the first set of peripheral devices, determining a second set of peripheral device that are free/available for connection to a second client device while the first client device is connected the first set of peripheral devices and providing information in the wireless network with respect to the second set. The invention resides in the insight that the host device should be being able to define sets of peripherals which sets are discoverable over the network. In the following, a set of peripherals that a device can dock with during a wireless docking action may be referred as a Wireless Docking Environment (WDE). Consequently, the host device according to the invention may prevent that all peripherals connected to the host device are locked and assigned to a single client device whilst being docked in the case when they are not needed or not used. By allowing another client device to dock with a second set of peripherals it improves the user experience and the expectations of users in multi-device docking situations. In particular when the docking environment includes many peripherals (e.g. docking with your entire house), or when it includes wireless peripherals (e.g. a Bluetooth keyboard or a wireless display) this is advantageous. If all peripherals that are connected to a host device are automatically assigned to a single client device, another client device would not be able to dock with those peripherals, which is restrictive for the users. Therefore in the system and method according to an embodiment of the invention, a host device keeps track of which peripherals are not used when docked with a certain client device, and announce the set of remaining peripherals as a separate WDE for other client devices to dock with. Advantageously, the first set is a non-empty subset of one of the one or more set with respect to which information was provided in the network.

According to an embodiment of the invention the host device is further adapted to determining and storing information whether a peripheral may be part of both the first set and the second set and information or that a peripheral may be exclusively used in either the first set or the second set. For example for a keyboard or mouse it should be clear to which WD the user input is sent. Hence, these peripherals need to be assigned to a single WD, and disallow usage by another WD. In contrast, in case of a printer, this could be used/shared between multiple docking devices. Hence it is advantageous that the host device maintains information which allows determining the Wireless Docking Environment (WDE) which best suit the interest of the user.

According to a further embodiment of the invention host device is adapted to communicate with the first client and the second client with a Wi-Fi connection, the host device adapted to add the information with respect to the set of free/available peripherals in the beacon frames, probe request/response frames or through pre-association service discovery response frame. Adding this information to these frames allows dockee devices to get information about the WDE (e.g. friendly name, which peripherals it consists of), which the dockee device can show to the user (e.g. by showing the list of WDEs from which the user can make a selection) before having to establish a Wi-Fi connection. Establishing a Wi-Fi connection takes time and typically requires certain user actions such as pairing the dockee device with the docking host (using e.g. Wi-Fi Protected Setup) to make the Wi-Fi connection secure.

According to a further embodiment of the invention the host device is adapted to advertize information in the wireless network with respect to the second set using different SSID information than that used to advertize information in the wireless network with respect to the first set, wherein preferably the host device is adapted to use a predefined scheme for SSID information. This can be helpful to distinguish the two different security domains needed for docking two different dockee devices.

Preferably, the host device is adapted to use a predefined naming scheme for identifying the second set of peripherals for allowing the client devices to distinguish between communications pertaining to the first set from communication pertaining to the second set. This makes it easier to distinguish for the user that the set of peripheral has been adapted by the docking host, and that he may be docking his dockee device with a number of peripherals that a simultaneously docked other dockee device is currently not using. This can make it easier for the users of the two dockee devices to determine possible conflicts that may arise if the two users both want to make use of a peripheral.

Advantageously, the determination that a peripheral device part of the first set is not being used by the first device is done by analyzing that the communication protocols to communicate with the respective peripherals have not been instantiated or initialized within a specified amount of time. A second client device may be interested in the largest set of free/available peripherals, and, in case of peripherals that are only used sporadically, such as printers, it advantageous to determine automatically is they are in use. Furthermore, the host device may make such the determination that a peripheral device part of the first set is not being used by the first device is done by analyzing that the communication protocols to communicate with the respective peripherals have not been instantiated or initialized within a specified amount of time. This would allow removing from a first set of peripherals a peripheral which were formally requested by a first client device but which were not used in practice. Furthermore, in case of USB based peripheral, the determination that a peripheral device part of the first set is not being used by the first device can be done by analyzing that no USB polling requests have been issued for USB devices by a USB host on the client device for a predefined period of time.

Advantageously, the host device further adapted to determine that a peripheral device part of the first set is not being used by the first device, the host device further adapted to remove peripheral device from the first set and to add the peripheral to the second set. This maintains the full flexibility for users, wherein peripheral may be moved from a set to another set depending on usage. Preferably such determination that the peripheral device part of the first set is not being used by the first device is based either on analyzing traffic between the first device and the peripheral or on receiving information from the first device that the peripheral is not used.

Advantageously, the host device is further adapted to establish a secure connection with the first client device using a first set of credentials and to establish a secure connection with the second client device using a second set of credentials. This measure ensures communication security where the traffic for each dockee cannot be intercepted by other dockees.

Advantageously, the host device is adapted to communicate with a second host device for receiving information with respect to a second peripheral connected to the second host device, the host device further adapted to add the second peripheral to the first and/or the second set of peripherals. This allows the creation of single environment covering multiple host devices.

Advantageously, the host device is adapted to use Wi-Fi direct for advertising information in the wireless network with respect to the second set, wherein a different value for one of the attributes in a Wi-Fi Direct P2P information element is used for advertising information in the wireless network with respect to the second set compared to a Wi-Fi Direct P2P information element is used for broadcasting information in the wireless network with respect to the first set. This is useful to make sure that two dockee devices being docked simultaneously do not interfere with each other, e.g. by specifying a different set of operating channels or by using different MAC addresses.

According to another aspect, the invention also related to a wireless client device for wireless communication to a host device according to the invention, the client device adapted to communicate with the host device via a Wi-Fi connection, the client device further adapted to extract from the beacon frames or from probe request/response frames or from pre-association service discovery response frames information with respect to second set and to use the extracted information for connection to one or more peripheral device from the second set.

The invention also relates to a method of communication between a host device, a first client device, a second client device and one or more peripheral according the independent method claim. By allowing another client device to dock with a second set of peripherals it improves the user experience and the expectations of users in multi-device docking situations. In an advantageous embodiment, the host device communicates with the first client and the second client with a Wi-Fi connection, the host device adding the information with respect to the set of free/available devices from the beacon frames or from probe request/response frames or from pre-association service discovery response frame.

Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

DETAILED DESCRIPTION OF EMBODIMENTS

Figure 1:
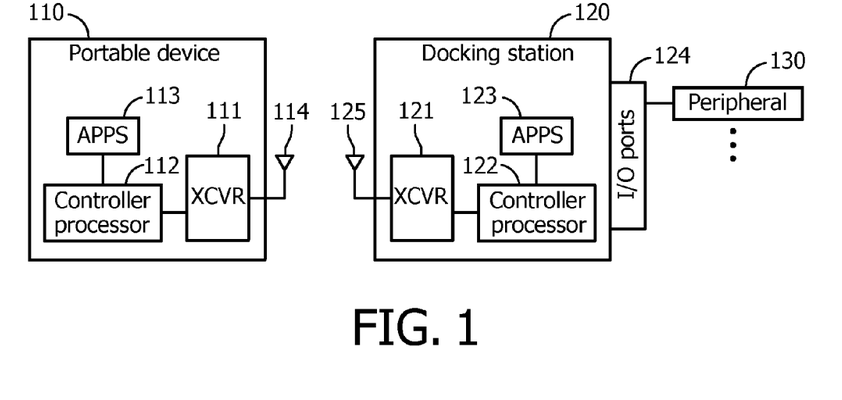
FIG. 1 shows a wireless docking system according to an embodiment of the invention.

FIG. 1 shows a wireless docking system wherein the invention may be practiced. Wireless docking employs wireless communication technology to provide a typically fixed or stationary docking environment for portable devices such as mobile phones, portable computers, other smart devices, and the like. The wireless docking environment gives a client device 110 (such as a portable device) access, via the host device 120 (may also be referred to a docking station or a Wireless Docking Host), to parts of a system comprising the host and one or more peripheral devices, such as audio system, a display screen, a keyboard, a mouse, storage media, and input/output ports, for example, any and all of which can be used to improve the experience and the productivity of the applications for the docked portable device. Peripherals can be externally connected to a host device's I/O ports through wires, can be connected wirelessly to a host device, or can be internally connected to a host device's internal bus (i.e. integrated inside the host device). The docking station may even afford the portable device access to a network (not shown), such as a wired or wireless local area network (LAN), wherein docking station 120 is connected wired or wirelessly to client devices (not shown) in the local network via an access point (not shown).

Client device 110 is sometimes called a dockee or wireless dockee. The host device 120 can also be referred to as a wireless docking host, docking station, or simply as a host. Docking is the act of setting up a connection and performing an exchange of messages between a dockee and docking station in order to realize a dockee being able to use one or more peripherals connected to the docking station. Docking between the dockee and the docking station may be wireless or wired. The connection lines shown in the figures are intended to represent a form of communicative coupling between the devices and are intended to be realized as wireless or wired connections. In the following descriptions, the connection between a dockee and a docking station is realized through a wireless connection (such as a Wi-Fi connection).

The term "wireless docking environment" may be used in the following description. It is intended to include the wireless docking station as well as any or a subset of peripherals, devices, input or output ports, systems, networks, or the like that are connected (externally or internally) to, or accessible from, the docking station. In order to realize wireless docking, the Client device 110 communicates wirelessly with one or more host devices 120 in order to gain access to the one or more peripherals 130 in the wireless docking environment 100.

Possible client devices include (but are not limited to) mobile phones, laptops, tablets, portable media players, cameras. Possible host devices include (but are not limited to) dedicated wireless docking station devices, display devices, audio devices, printers, PCs. Possible peripherals include (but are not limited to) wireless mice, keyboards, display devices, audio devices, webcams, printers, storage devices, USB hubs. Optionally, some of these peripherals may support standards such as Wi-Fi Serial Bus and Wi-Fi Display to make their functionality available through the wireless network to other devices such as the client devices and the host device. Some of the peripherals may also communicate via other wireless standards such as Bluetooth or NFC. Wired peripherals may be connected to the wireless network by connecting them to the host device or to an intermediate device via wires, e.g. a USB Hub device which supports Wi-Fi Serial Bus. Peripherals and client devices dockees may also be able themselves to act as host devices.

In a wireless docking environment shown in FIG. 1, it is possible to group many peripheral devices with a single docking station so that the peripherals can be accessed by a portable device initiating a docking action. The portable device is considered to be "docked"—that is, the portable device is in a docked state—when it has access via the docking station to one or more of the devices, which are considered as a part of the wireless docking environment selected for docking. This may also include a default wireless docking environment (consisting e.g. of all peripherals connected to the docking station) that is automatically selected (or assumed) whilst docking. When it is desired to disconnect the portable device from the wireless docking environment, an undocking action is initiated. The portable device is considered to be "undocked"—that is, the portable device is in an undocked state—when the portable device no longer has access to, or a connection with, those same peripheral devices via the docking station.

A docking process that leads from an undocked to a docked state can be defined to include a number of different elements. These elements include, but are not limited to: a trigger event to initiate the docking process; establishment of one or more wireless connections (i.e., one or more communication paths) between the portable device and the wireless docking host or hosts; and selection of wireless protocols, such as Wi-Fi channels, and interface settings in order to allow the portable device access to, and interaction with, each peripheral device in the wireless docking environment. The various parts of the process can be undertaken by one or both of the portable device and the docking station.

The established connection or communication path between the docking station and the portable device is generally a secure path, although insecure connections may be employed for docking.

For completeness, it is useful to distinguish between the concepts of physical docking versus logical docking. When a portable device is laying on a docking pad, or when it is positioned in a cradle, or when it has been placed by the user inside an area—whether physically demarcated or simply known to exist within certain boundaries—that is associated with a docking station or docking environment, it can be said that the portable device is physically docked to the docking station. Once a portable device enters the state of being physically docked, it is possible for this occurrence to trigger a docking action, which would result in the portable device also becoming logically docked. Removal of the portable device from the state of being physically docked may not necessarily result in the portable device being removed from its logically docked state.

Exemplary simplified realizations of a client device 110 and a host device 120 are shown in FIG. 1. The client device includes: a transceiver 111; a processor/controller 112; a memory 113 suitable for storing configuration information, driver information, and device applications (memory 113 is depicted in the figures as storing the applications, for example); and an antenna 114. Device control and operation is provided via controller processor 112, which is connected between the transceiver 111 and the memory 113. The transceiver 111 provides the radio capabilities including transmission and reception. It is connected to antenna 114. While one antenna is shown in the figure, it will be understood that client device 110 may include more than one antenna operating in a single or even dual mode capacity. The portable device applications also include, but are not limited to, the docking procedure, the undocking procedure, and the threshold calibration and configuration procedure, for example.

Host device 120 includes a transceiver 121, a processor/controller 122, a memory 123 suitable for storing configuration information, driver information, and device applications, input/output ports 124, and an antenna 114. Host device control and operation is provided via controller processor 122, which is connected between the transceiver 121 and the memory 123. The transceiver 121 provides the radio capabilities including transmission and reception for the docking station. It is connected to antenna 125. While one antenna is shown in the figure, it will be understood that docking station 120 may include more than one antenna operating in a single or even dual mode capacity. The host device applications also include, but are not limited to, the docking procedure, the undocking procedure, and the threshold calibration and configuration procedure, for example. Since the host device allows connection to peripherals 130 via the input/output ports 124, the docking station memory will also include drivers for establishing and maintaining the connection to each peripheral. Input/output ports 124 provides a sufficient number of connection ports, such as input ports and output ports and bidirectional ports, for connecting peripheral devices in the wireless docking environment.

The main element of the invention is a system and method whereby a host device WDH1 is offering a wireless docking environment WDE1 to which, in a first step, a client device WD1 docks; this is followed by the host device providing (e.g. by means of advertising or broadcasting) information in the network with respect to a second wireless docking environment WDE2, the second wireless docking environment WDE2 comprising a (non-empty) subset of peripherals of WDE1 not used by dockee device WD1, the second wireless docking environment WDE2 for a second dockee device WD2 to dock with. While performing the method, the host device may be adapted to receiving via the wireless network a request from a first client device to connect to a first set of peripheral devices and to determining that the first client device is docked with the first set of peripheral devices.

As defined before, a set of peripherals is advertized as a wireless docking environment (this may be a default wireless docking environment consisting e.g. of all peripherals connected to a wireless docking host). It shall be noted that a host device may offer one or more pre-configured WDEs to a client device to dock with. When a client device docks with a WDE, this action can be performed by issuing a command such as "dock (WDE)". However this shall not be interpreted as meaning that there is a one-to-one correspondence between the first set of peripheral devices and one of sets being advertized in the network. The wireless docking environment may simply be a non-empty subset of one of the sets being broadcasted in the network. This implies that the first set of peripheral devices is a WDE in the context of wireless docking, but such sets are dynamic. It is also important to note that in case a host device offers multiple pre-configured wireless docking environments, that a second client device can issue a dock (WDE) command to another pre-configured WDE than the one that the first client device is connected to.

The system as proposed by this invention allows the dynamic creation of a new set of peripherals or an adaptation to an existing pre-configured subset of peripherals.

Figure 2:
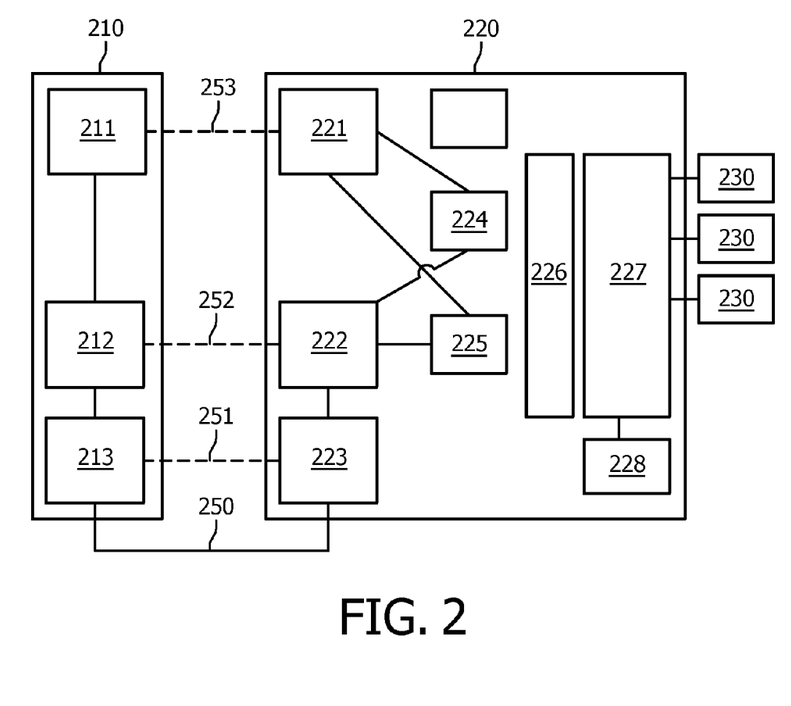
FIG. 2 shows wireless docking system according to another embodiment of the invention.

FIG. 2 shows wireless docking environments according to another embodiment of the invention. Herein, instead of describing the host device and the client device in term of discrete components such as memory, controller and antenna/transceiver, these will be described in term of functional modules being implemented.

The host device 220 has a Wi-Fi radio subsystem 213 (which would include antenna, transceiver and drivers and relevant control functions implemented on the main processor of the host device) configured to allow a client device 210 to discover a wireless docking environment over the network. The client device is able to connect host device 220 through the wireless network, for example by establishing a Wi-Fi Direct connection between the two devices.

Wi-Fi Direct (a.k.a. Wi-Fi Peer to Peer), known from the document "Wi-Fi Peer-to-Peer (P2P) Technical Specification, Version 1.1, 2010", from the Wi-Fi Alliance is a standard that allows Wi-Fi devices to connect to each other with no need for a wireless access point. Wi-Fi Direct plays an important role for connecting standalone wireless devices and peripherals, such as display devices/peripherals supporting Wi-Fi Display, and I/O devices/peripherals supporting Wi-Fi Serial Bus (e.g. wireless mouse, keyboard, printer, USB hub).

The host device 220 further comprises a peripheral connection subsystem 227 to which external peripheral devices 230 and internal peripheral devices 228 (typically I/O devices) can be physically or wirelessly connected. Examples of external peripheral devices 230 classified by the connection protocol being used are USB peripherals, Bluetooth peripherals, wireless USB (WSB) peripherals, audio peripherals, HDMI/Display Port/VGA peripherals. Consequently the peripheral connection subsystem 227 may support one or more communication protocols.

The host device 220 further includes a control subsystem, for example a processor/controller and memory subsystem. The control subsystem is capable of controlling/running a Wi-Fi docking manager system 222 and a hardware abstraction layer (HWA) 226 enabling a software representation of each peripheral device 230 connected to the peripheral connection subsystem 227. The Wi-Fi docking manager system 222 is capable of configuring the Wi-Fi radio subsystem 213 to enabling the advertisement and discovery of its wireless docking capabilities (such as whether or not it can support simultaneous connection with multiple dockee devices) through Wi-Fi Direct beacon frames, probe request/response frames or through pre-association service discovery response frames, or by using pre-defined information elements. The Wi-Fi docking manager system 222 is further capable of advertising in cooperation with the Wi-Fi radio system information about the peripheral devices and/or sets of peripheral devices (WDE1 . . . WDEn) available for docking. For example this can be realized by constructing a 802.11u based service discovery response that includes information about the properties of a WDE (e.g. friendly name) and the peripherals of a WDE. An example data structure (e.g. in binary, textual, XML format) that can be used for this is:

```
Responding_WDH_ID
    for (i=0; i < n_WDEs; i++){
    WDE_status
    WDE_properties( )
    n_PFs
    for (j=0; j < n_PFs; j++){
        PF_ID
        PF_name
    }
    }
``` whereby a PF_ID refers to a data structure for providing more information about a peripheral, such as its friendly name, status, etc.

The value of the service discovery response may depend on a value provided in the corresponding service discovery request (e.g. WDE_ALL or PF_ALL to receive information about all WDEs/Peripherals independent of their status versus WDE_FREE or PF_FREE to receive only information about WDEs/PFs which are free to dock with).

By default, a host device 220 may chose to advertise only a "default" WDE that consists of all the peripherals connected to the host device 220. It may also advertize other pre-defined WDE or WDE that were defined in the past by a user. The Wi-Fi radio subsystem is further configured to listen for Wi-Fi Direct connection setup requests (e.g. P2P GO negotiation request). Upon receiving a Wi-Fi Direct connection setup request it establishes a Wi-Fi communication channel between a first client device 210 and the host device 220, after which messages are exchanged between the host device 220 and the first client device 210 for initializing the docking protocol. Upon receiving a docking request message (e.g. "dock (WDE1)" message using a pre-determined format at a pre-determined port), the Wi-Fi Docking management system will change the status of the chosen WDE (i.e. WDE1) and its peripherals to e.g. UNAVAILABLE for other devices to use.

Figure 3:
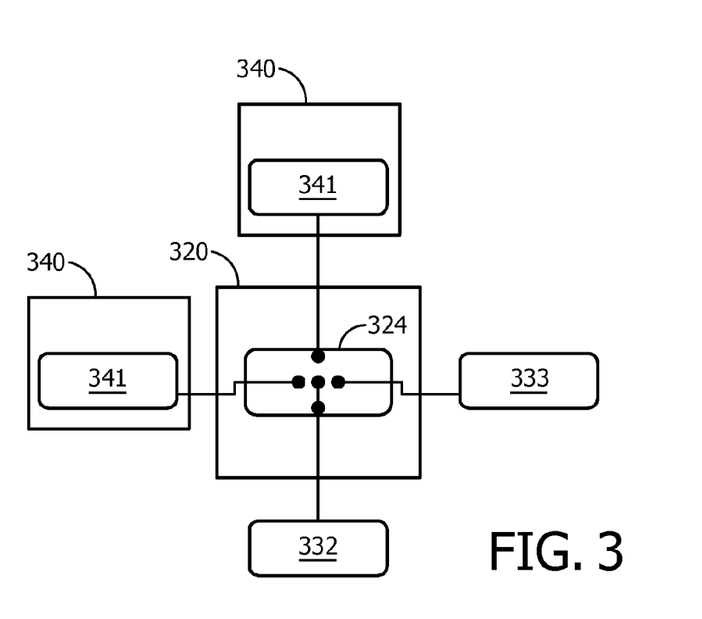
FIG. 3 shows wireless docking environments wherein the wireless USB protocol is used for sharing a peripheral between two client devices

In FIG. 3 the various communication layers between the host device and client device are also illustrated. At the lowest level, one finds the physical connection layer layer (e.g. Wi-Fi physical layer) 250 on top of which the Wi-Fi Direct connection layer (advertisement, P2P group formation etc) 251 is present. At highest level the Peripheral function protocol layer 253 is used for communication between devices.

Through the docking protocol, the first client device 210 is provided with instructions how to establish communication with each of the peripherals in WDE1. The protocols used for communication with the peripherals are so-called peripheral function protocols (PFPs). Example peripheral function protocols are Wi-Fi Display for streaming the display output of a client device over Wi-Fi to a display peripheral connected to host device 220, and Wi-Fi Serial Bus (WSB) for tunneling USB traffic between the first client device and one or more USB peripherals connected to the host device 220. In a preferred embodiment, the host device 220 also has two subsystems PF tracking system 225 and PF switching system 224. These subsystem are either under control or part of the Wi-Fi Docking manager 222. The PF tracking system 225 is responsible for keeping track which peripherals of wireless docking environment WDE1 are in use and which are not in use by a wireless dockee WD1 or which can be shared between wireless dockees. Based on this information the PF tracking system may set the status of PFs that are not used by WD1 as free/available for another dockee to dock with.

The above function can be implemented in various ways. Example embodiments include:

A. The PF tracking system 225 automatically determines that the peripheral is not used by the client device by analyzing the traffic between the first client device and each of the peripherals in WDE1. Examples include but are not limited to:

by analyzing that the peripheral function protocols to communicate with the respective peripherals have not been instantiated or initialized within a specified amount of time (e.g. no session established for the specific peripheral function protocol (for example no RTSP SET_PARAMETER request message containing the trigger parameter SETUP received for Wi-Fi Display), no Wi-Fi Direct services session established (i.e. no REQUEST_SESSION message received) for a Wi-Fi Direct service implementing a particular peripheral function protocol, no USB SET_CONFIGURATION Control Request received for the USB devices tunneled over Wi-Fi Serial Bus, or some related Wi-Fi Docking protocol specific messages (e.g. setup(PF)) not received)

by analyzing that no USB transaction requests (e.g. USB IN request) have been issued for USB devices by the first client device for a predefined period of time.

B. The PF tracking system 225 receives information from the first client device that one or more peripheral devices are not used (e.g. using Wi-Fi Docking protocol specific messages (e.g. de-select(PF))).

C. Based on the specific request for a certain WDE configuration being requested to dock, the PF tracking system 225 will mark those peripheral not being part of the WDE configuration being requested as free/available to dock with.

D. The PF tracking system 225 will track for each peripheral whether it is sharable between multiple client device or it may only be used exclusively by a single client device.

Preferably, the host device 220 informs the first client device (e.g. by sending a dedicated docking protocol message or event notification to the client, or the client device polling state information of the host device and/or peripherals) and/or asks the first client device to confirm that the peripherals are indeed not used and can be made available for other wireless dockees.

Upon establishing by the PF tracking system 225 that one or more peripherals are not used by dockee device WD1, the Wi-Fi Docking management system adds these not used peripherals to a second set of peripherals (WDE2), which can be a new WDE or an extension of previously configured WDE.

In a further embodiment, the first device is asked to explicitly remove the indicated unused peripherals from its WDE. In an even further embodiment, the first device undocks from its first set, and then docks with the first set minus the peripherals to initiate this. In a further embodiment, the first device does not lose the connection with the actively used peripherals if he undocks and docks again (with the smaller set) within a certain time, or if whilst being docked he docks again but now with the smaller set.

Assuming that the host device is capable of serving multiple client devices connected to different WDEs simultaneously, the Wi-Fi Docking management system configures the Wi-Fi radio subsystem to advertise this second set of peripherals (WDE2) to be free/available to dock with by another dockee device, and to listen for Wi-Fi Direct connection setup connection requests by other dockee devices. Preferable, the names/identifiers use to denote WDE2 in advertisement messages (such as Wi-Fi Direct beacon frames, probe request/response frames, pre-association service discovery response frames, pre-defined information elements, UPnP discovery messages) is established using a naming scheme that allows for easy identification of the nature of these peripherals (by the user of dockee device WD2), e.g. using a predefined naming scheme that uses the name of the first set of peripherals appended with the suffix "_LEFTOVERS", or "PF_FREE" to indicate a wireless docking environment consisting of the peripherals which are free to dock with.

Using the same steps as described before, a second client device WD2 can establish docking with the peripherals of WDE2.

When a second client device WD2 docks with WDE2, the PF switching component 224 is instructed to relay/route/redirect any incoming and outgoing peripheral function protocol traffic to WD2, for all non-shareable peripherals used by WD2. The PF switching component may close an existing communication session (if any) between WD1 and the non-shareable peripheral and/or clear the internal state of the non-shareable peripheral, in order to enable setting up a communication session between WD2 and the non-shareable peripheral.

If multiple non-shareable USB peripherals are connected with a wire to different ports of the same physical USB (root) hub H0 inside or connected to the wireless docking host, whereby one of the peripherals P1 is part of WDE1 and another peripheral P2 is part of WDE2, the wireless docking host may provide a virtualized (i.e. simulated) instance P1' and P2' of each individual USB peripheral, whereby P1' and P2' are configured in such a way that they can be enumerated as if each of these USB peripherals were connected to a different USB (root) hub or as standalone USB devices.

These virtualized instances P1' and P2' can be made accessible to a dockee through the Wi-Fi Serial Bus (WSB) protocol either as if P1' and P2' are connected to separate WSB Hubs WH1 and WH2, or as standalone WSB Devices P1" and P2". A dockee that docks with WDE1 will be provided WSB access to and/or information about P1" or WSB Hub WH1, but will not be given access to and/or information about P2" or WSB Hub WH2. This allows a dockee that docks with WDE1 and enumerates the available USB devices to see peripheral P1', but not P2'.

The PF switching component will relay/route/redirect all incoming and outgoing USB traffic transferred and received through WSB and that is directed to these virtualized peripherals to the correct physical USB (root) hub port of the wireless docking host.

FIG. 3 shows wireless docking environments wherein the wireless USB protocol is used for sharing a peripheral between two client devices by use of Wi-Fi Serial Bus. In this figure, 340 represents client device WD1 and WD2, 341 represents the WSB host system in both client device WD1 and WD2, 320 the host device, 324—the PF switch system, and 332-333 are WSB peripheral systems in the host device.

The non-shareable peripheral functions that were originally part of WDE1, and are now part of WDE2 and docked with by client device WD2 instead are therefore not reachable anymore by WD1, even if after this time it would try to instantiate or use the peripheral function (e.g. if WD1 was not aware that the peripheral was given to another dockee due to inactivity). This should result in a meaningful error situation for client device WD1 (e.g. by sending a related error message using the Wi-Fi Docking protocol). Client device WD1 may inform the user about the error situation. If client device WD1 had previously confirmed to the host device that the peripheral can indeed be used by another client device, then it can use this information whilst providing feedback to the user and should not try to reinitialize the peripheral function protocol connection.

Client device WD1 may (based on user feedback) try to reestablish/reinitialize the peripheral function protocol connection. This can be detected by the PF tracking system, upon which the wireless docking management system may decide to give the peripheral back to be used by Client device WD1, and reverse the actions that have been taken, and inform WD2 about the situation.

Below are a number of alternative and further embodiments relevant to the embodiment described above:

In an alternative embodiment, wireless docking host WDH1 advertises WDEs not through pre-association service discovery, but through information elements part of device discovery beacon and probe request/response frames, e.g. an additional wireless docking specific information element (IE), or a different value for one of the attributes in the Wi-Fi Direct P2P Information Element (P2P IE), e.g. a different operating channel, SSID or a different P2P interface address.

The information about WDEs and Peripherals and changes thereof may also be communicated over an IP connection, established after the Wi-Fi Direct connection between Client device WD1 and host device WDH1 has been set up, e.g. through UPnP discovery messages/events related to a UPnP Docking service description, or specific docking protocol messages.

In a further embodiment, the second set of peripherals is persistently stored by WDH1 for subsequent use (upon confirmation by the user).

In a further embodiment, the host device WDH1 also adds peripherals that are known to be shareable between multiple wireless dockees to the list of peripherals that are part of wireless docking environment WDE2.

In a further embodiment, the host device WDH1 communicates with a second host device WDH2 for receiving information with respect to one of the peripheral connected to the second host device, whereby WDH1 adds the second peripheral to the first and/or the second set of peripherals.

In a further embodiment, wireless docking host WDH1 detect which type of peripherals (e.g. USB game controller) are connected to it and/or which types of peripherals are still free/available, and use this information (possibly using other contextual information and user configurable information) to derive the type/profile of wireless docking environment, i.e. is it a productivity WDE, entertainment WDE, car WDE, meeting room WDE, etc. and change the friendly names of WDE1 and WDE2 (and possibly other settings of the WDEs) accordingly. Similarly, WDH1 can determine based upon this information, whilst establishing which existing or new WDE is best served by adding non-used peripherals of WDE1 to it, e.g. if the printer part of WDE1 is not used by dockee device WD1, then it is best served by adding it to an office productivity WDE.

In a further embodiment, wireless docking host WDH1 uses a different set of security credentials for docking by a wireless dockee WD2 with wireless docking environment WDE2 than for the docking connection by wireless dockee WD1 with docking environment WDE1. This is to prevent overhearing of the traffic between wireless dockee WD1 and wireless docking host WDH1 by wireless dockee WD2, and vice versa.

In a further embodiment, wireless docking host WDH1 uses a different P2P Group for connecting with wireless docking environment WDE2 than for wireless docking environment WDE1.

In an alternative embodiment, Tunneled Direct Link Setup (TDLS) is used for setting up the direct connection between a wireless dockee device and a wireless docking host.

In an further embodiment, Bluetooth, NFC, or other wireless technologies are used during one or more steps of the process of identifying, discovering and/or setting up a connection to wireless docking environment WDE2.

In an alternative embodiment, the docking host WDH1 receives information from the first dockee device WD1 about a second dockee device WD2 and a peripheral device in the first set, after which the host informs the indicated second device WD2 to connect to the indicated peripheral device (e.g. by docking with an indicated second set of peripherals WDE2) through some specific Wi-Fi Docking protocol messages.

In an alternative embodiment, the first dockee device WD1 communicates directly with second dockee device WD2, provides information to the second device WD2 about a peripheral device in the first set, after which the second device connects to the peripheral device through the host or alternatively through the first device (i.e. first device becomes a host for the peripherals it is docked with).

In a further embodiment, the PF switch system is controllable by a dockee through specific messages in the Wi-Fi Docking protocol.

Figure 4:
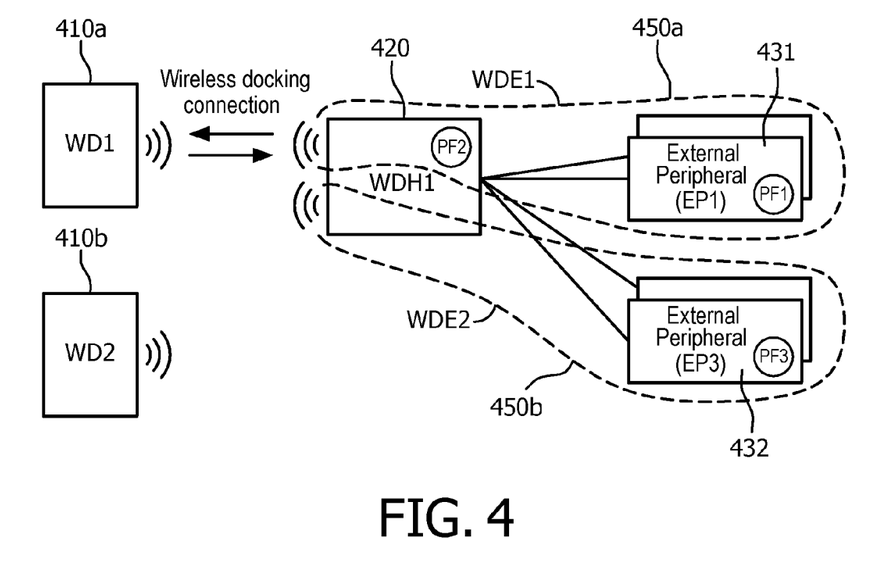
FIG. 4 illustrates the concept of wireless docking environments

FIG. 4 illustrates the concept of wireless docking environments wherein the methods according to the invention may be practiced. Herein 410a denotes the first client device; 410b the second client device; 420 the host device; 431 a first external peripheral and 432 a second external peripheral. Furthermore two wireless docking environments are illustrated, where 450a is a first wireless docking environment 1, herein illustrated as including first external peripheral while 450b is a second wireless docking environment herein illustrated as including the second external peripheral while 450b. As indicated previously these wireless docking environments could each include multiple peripherals and a peripheral could be shared between the two environments (not illustrated in the drawing). In the method according to the invention the host device provides information in a wireless network with respect to availability of wireless docking environments 450a; the host device receives via the wireless network a request from a first client device 410a to connect to wireless docking environments 450a. The host device determines that the first client device is docked with wireless docking environment 450a and that wireless docking environment 450b is free/available for connection for a second client device. The host device provide information in the wireless network with respect to wireless docking environment 450b and second client device receiving the information with respect to the wireless docking environment 450b and uses this information to connect wireless docking environment 450b.

Figure 5:
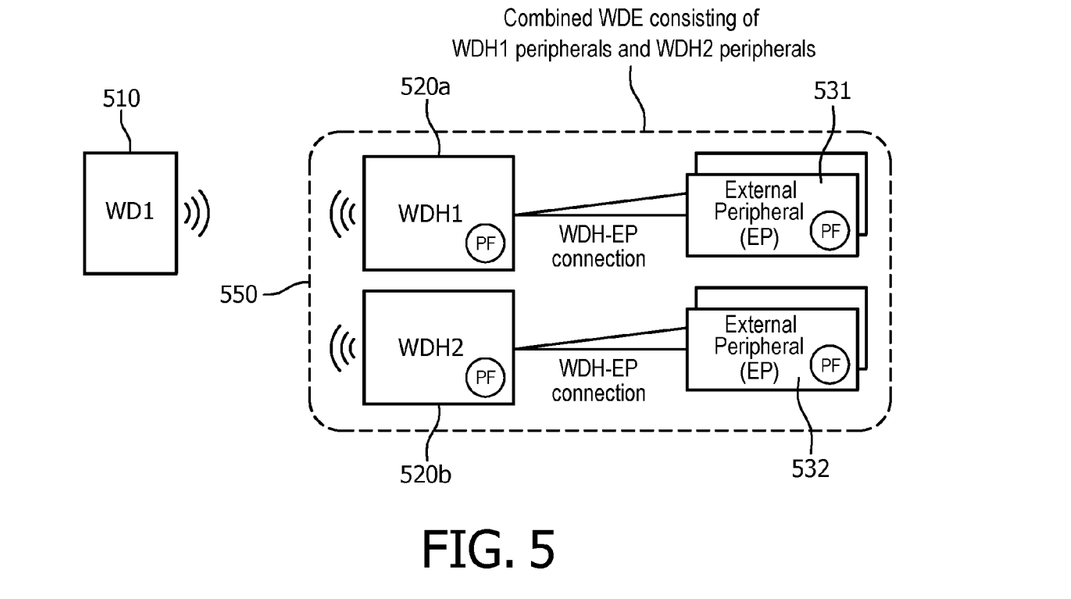
FIG. 5 illustrates the concept of a combined wireless docking environment comprising at least two host devices The figures are purely diagrammatic and not drawn to scale. In the Figures, elements which correspond to elements already described may have the same reference numerals.

FIG. 5 illustrates the concept of a combined wireless docking environment comprising at least two host devices Also in situations where multiple WDHs can form multi-WDH docking environments, the user experience will be improved if not all peripherals from all WDHs are being used simultaneously, by allowing another wireless dockee to dock with the remaining peripherals, as illustrated in the figure below. This figure shows a setup whereby the peripherals of two WDHs are combined into a single docking environment, i.e. if a WD1 docks through either WDH1 or through WDH2, all peripherals will be assigned for use by WD1. However, if not all peripherals are used and for example a big portion of the peripherals of WDH2 are not being used whilst being docked with WD1, then it makes sense that another device can be docked with the remaining peripherals of WDH2. In particular if the user of WD1 had placed his device in close vicinity of WDH1, but not WDH2, another user may expect WDH2 to be free/available to dock with.

Although the invention has been mainly explained by embodiments using wireless docking, the invention is also suitable for any wireless system where an unconnected wireless device needs to connect to a group of devices. The invention is relevant to Wi-Fi Docking enabled devices, Wi-Fi Serial Bus devices, Wi-Fi Display devices, and any other devices supporting Wi-Fi Direct ranging from portable audio devices, mobile phones, laptops, tablets to Wi-Fi mice, keyboards, display devices, printers, cameras.

It is to be noted that the invention may be implemented in hardware and/or software, using programmable components. A method for implementing the invention has the steps corresponding to the functions defined for the system as described with reference to FIG. 2.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

LIST OF REFERENCE NUMERALS IN THE DRAWINGS

FIG. 1
110—client device
111—transceiver
112—processor/controller
113—memory
114—antenna
120—host device
121—transceiver
122—processor/controller
123—memory
124—antenna
FIG. 2
210—client device
211—peripheral function protocol (e.g WiFi, display, WSB)
212—Wi-Fi docking manager
213—Wi-Fi radio subsystem
220—host device
221—peripheral function protocol (e.g WiFi, display, WSB)
222—Wi-Fi docking manager
223—Wi-Fi radio subsystem
224—PF switch
225—PF tracker
226—HWA
227—peripheral connection sub-system
228—Internal peripherals
230—peripherals (e.g. USB, BT, WSB, Audio, HDMI/DP/VGA)
250—physical connection layer layer (e.g. Wi-Fi physical layer)
251—i-Fi Direct connection layer (advertisement, P2P group formation etc)
253—Peripheral function protocol layer FIG. 3
310—client device 1
311—WSB host 1
320—host device
324—PF switch
331—WSB peripheral
332—USB peripheral
340—client device 2
341—WSB host 2
FIG. 4
410a—first client device
410b—second client device
420—host device
431—external peripheral 1
432—external peripheral 2
450a—wireless docking environment 1
450b—wireless docking environment 2
FIG. 5
510—client device
520a—first host device
520b—second host device
531—external peripheral 1
532—external peripheral 2
550—combined wireless docking environment

The invention claimed is:

1. A wireless docking host device comprising:
a transceiver for communicating with at least one client device and at least one peripheral device;
a processor connected to a memory for storing configuration information and for controlling the transceiver;
the host device configured to:
provide first information in a wireless network with respect to availability of one or more sets of the peripheral devices to be connected with a first client device;
receive via the wireless network a request from the first client device to connect to a first set of peripheral devices;
determine that the first client device is docked with the first set of peripheral devices;
determine that the at least one peripheral device is not used by the first client device by analyzing traffic between the first client device and the at least one peripheral device;
determine a second set of peripheral devices that are available for connection to a second client device while the first client device is docked, the second set of peripheral devices being a subset of the first set of peripheral devices; and
provide second information in the wireless network with respect to the second set in order to connect the second client device to the at least one peripheral device from the second set.

2. The host device according to claim 1, wherein the host device is further configured to determine whether the at least one peripheral device belongs to the first set and the second set or that the at least one peripheral device is exclusively used in either the first set or the second set.

3. The host device according to claim 2, wherein the host device is configured to communicate with the first client device and the second client device via a Wi-Fi connection, and the host device is further configured to add the information with respect to the set of available peripheral devices in beacon frames, probe request/response frames or through a pre-association service discovery response frame.

4. The host device according to claim 3, wherein the first set is a non-empty subset of one of the one or more sets with respect to which information is provided in the network.

5. The host device according to claim 3, wherein the host device is configured to use a predefined naming scheme for identifying the second set of peripheral devices for allowing client devices to distinguish between communication pertaining to the first set from communication pertaining to the second set.

6. The host device according to claim 1, wherein the determination that the at least one peripheral device is not used by the first client device is done by determining that a communication protocol to communicate with the at least one peripheral device has not been instantiated or initialized within a specified amount of time.

7. The host device according to claim 1, wherein the determination that the at least one peripheral device is not used by the first client device is done by analyzing that no USB transaction requests have been issued for USB devices by the first client device for a predefined period of time.

8. The host device according to claim 1, wherein the determination that the at least one peripheral device is not used by the first client device is based on receiving information from the first client device that the at least one peripheral device is not used.

9. The host device according to claim 1, wherein the host device is configured to establish a secure connection with the first client device using a first set of credentials and to establish a secure connection with the second client device using a second set of credentials.

10. The host device according to claim 1, wherein the host device is configured to communicate with a second host device for receiving information with respect to a second peripheral device connected to the second host device, and the host device is further configured to add the second peripheral device to the first or the second set of peripheral devices.

11. The host device according to claim 3, wherein the host device is configured to use Wi-Fi direct for advertising information in the wireless network with respect to the second set, wherein a different value for an attribute in a Wi-Fi Direct P2P information element or Wi-Fi Direct Service Discovery Response Frame is used.

12. A method of communicating among a host device, a first client device, a second client device and at least one peripheral device, the method comprising:
providing first information in a wireless network with respect to availability of one or more sets of the peripheral devices to be connected with the first client device;
receiving via the wireless network a request from the first client device to connect to a first set of peripheral devices;
determining that the first client device is docked with a first set of peripheral devices;
determining that the at least one peripheral device is not used by the first client device by analyzing traffic between the first client device and the at least one peripheral device;
determining a second set of peripheral devices that are available for connection to the second client device while the first client device is docked, the second set of peripheral devices being a subset of the first set of peripheral devices;
providing the second information in the wireless network with respect to the second set; and receiving the second information with respect to the second set in order to connect the second client device to the at least one peripheral device from the second set.

13. The method according to claim 12, wherein the host device communicates with the first client device and the second client device via a Wi-Fi connection, the host device adds the information with respect to the second set in beacon frames, in probe request/response frames, or in a pre-association service discovery response frame;

the second client device extracts said information with respect to second set; and the second client device uses the extracted information for connection to one or more peripheral device from the second set.

14. A non-transitory computer readable medium having instructions which, when executed by a processor, enable a host device to communicate with a first client device, a second client device and at least one peripheral device, the host device comprising:

a transceiver for communicating with the first client device, the second client device and the at least one peripheral device;

a processor connected to a memory for storing configuration information and for controlling the transceiver;

the host device configured to:

provide first information in a wireless network with respect to availability of one or more sets of the peripheral devices to be connected with a first client device;

receive via the wireless network a request from the first client device to connect to a first set of peripheral devices;

determine that the first client device is docked with the first set of peripheral devices;

determine that the at least one peripheral device is not used by the first client device by analyzing traffic between the first client device and the at least one peripheral device;

determine a second set of peripheral devices that are available for connection to a second client device while the first client device is docked, the second set of peripheral devices being a subset of the first set of peripheral devices; and provide second information in the wireless network with respect to the second set in order to connect the second client device to the at least one peripheral device from the second set.

* * * * *